Dec. 29, 1959 C. JELINEK, JR., ET AL 2,919,304
FACSIMILE TRANSMITTING SYSTEM
Filed Dec. 23, 1955
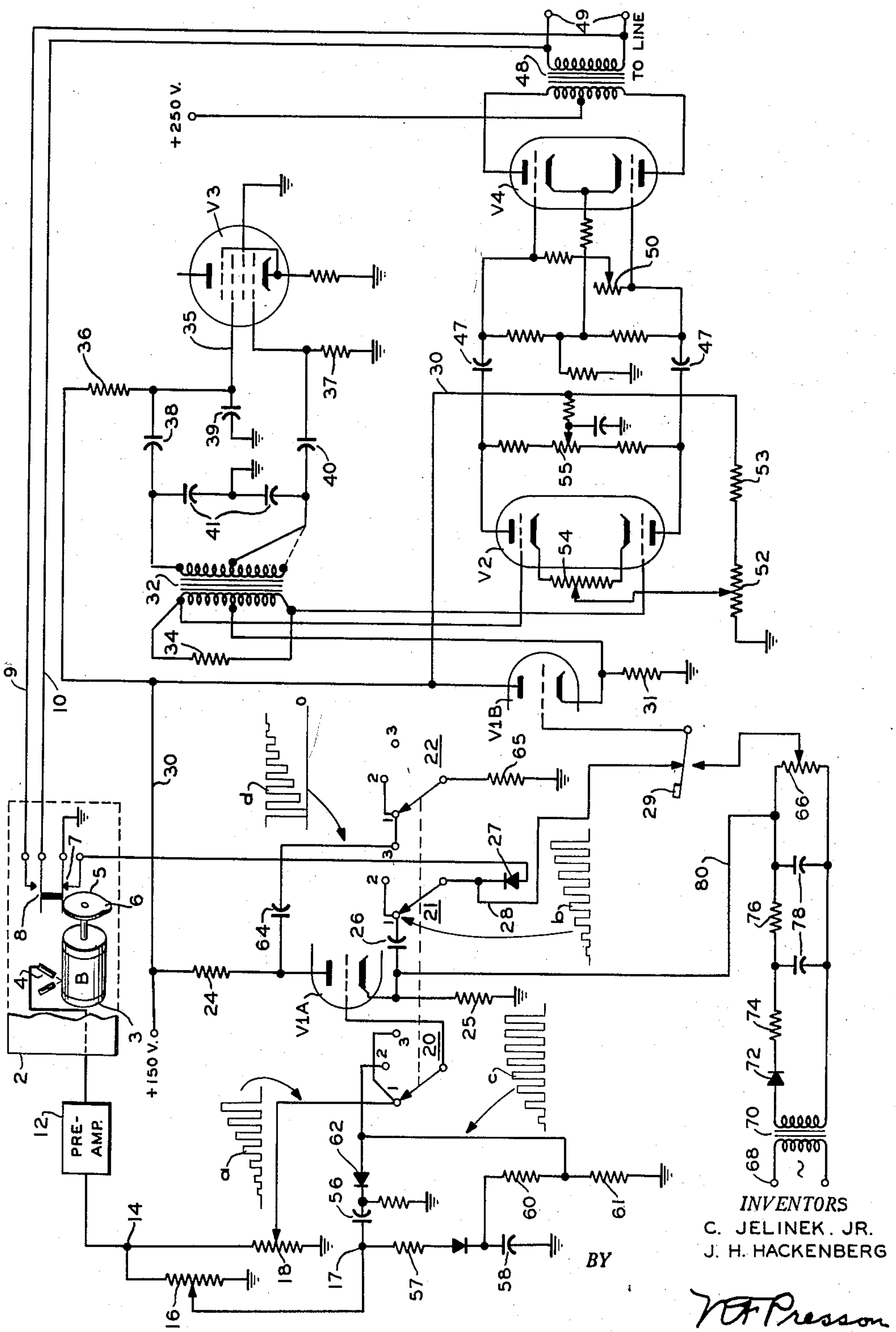
INVENTORS
C. JELINEK, JR.
J. H. HACKENBERG
BY
[signature]
ATTORNEY United States Patent Office 2,919,304

Patented Dec. 29, 1959

2,919,304

FACSIMILE TRANSMITTING SYSTEM

Charles Jelinek, Jr., Verona, N.J., and John H. Hackenberg, Flushing, N.Y., assignors to The Western Union Telegraph Company, New York, N.Y., a corporation of New York Application December 23, 1955, Serial No. 555,088

6 Claims. (Cl. 178—7.1)

This invention relates to a facsimile transmitting system and more particularly to a facsimile transmitting circuit that provides greater flexibility of operation, and ease of adjustment and lineup procedure, in regard to subject-matter copy on transmitting blanks with different background colors that may vary within wide limits from white to black, and having either light or dark characters or other subject matter thereon to be transmitted.

In the larger offices of commercial telegraph and other communication companies, the preparation of facsimile copy to be transmitted can be controlled so that the letters, characters or other subject matter on a transmitting blank are properly delineated thereon to provide good copy exhibiting a desired color contrast between the marked areas and the background area of the blank, and the photocell pickup device has no difficulty in distinguishing between these areas. Also, the proper background level and the proper output signal levels of the system can be established by lineup procedures, and can be maintained in service, by means of an oscilloscope or other elaborate testing apparatus.

In patrons' offices and particularly in private wire service installations, effective control over the preparation of the subject-matter copy is not ordinarily obtainable, with the result that subject-matter copy is sometimes produced in which some of the characters of a message written or typed on a transmitting blank are too light in color to provide sufficiently good contrast to enable the photocell pickup device to distinguish properly between such marked areas and the background. The background color of the transmitting blanks also may vary considerably from white, and the tinctorial strengths of the typewriter inks employed often vary. Thus, poor copy from the standpoint of facsimile transmission may result. Moreover, the patron may wish to transmit blueprints, photostat negatives or other subject matter where the background color of the sheet is darker than the characters.

In accordance with the instant invention, the system provides means whereby when good copy is obtainable for transmission i.e., copy in which all of the characters or marked areas are of sufficient density and sharply outlined so as to reproduce clearly at the recorder, the amplitude of the transmitted facsimile intelligence signals is substantially proportional to the density of the characters being scanned. For brevity, these signals are hereinafter referred to as linear signals. When poor copy is to be used for transmission, i.e., copy in which some or all of the characters are of such low density or are poorly defined so as to reproduce poorly at the recorder, the system is converted into one in which the signals resulting from scanning characters or marked areas of low density are amplified out of proportion to those resulting from higher density characters. For brevity, such signals are hereafter referred to as non-linear signals. The overall effect of the non-linear operation is to raise the level of the amplitude of the signals produced when scanning low density or light-colored characters and cause them to produce good legible characters in the recorded copy.

If the patron desires to transmit blueprints, photostat negatives or other subject matter such that the background is dark and the characters are light, the above mentioned switch may be thrown to a third position which causes this type of copy which is essentially negative in character to be transmitted as positive and reproduced at the recorder as a positive, the words "positive" and "negative" being used in a photographic sense. When recording on most types of recording papers, it is desirable to produce a positive copy so that the background is not black or dark colored. All of the foregoing conversions may readily be effected by the patron without disturbing the proper adjustment and output signal levels. The system is arranged to clamp to the background of all subject copy, regardless of the color or density of the background, so that a very low level of signal is obtained which does not mark the recording blank as a result of scanning the background of the transmitting blank.

The system has circuit elements which clamp the signals to an artificial background level as a reference in a manner to enable testing, adjustment and lineup procedures readily to be effected on a patron's premises in order to obtain the proper output signal levels, and without requiring an oscilloscope or other elaborate testing equipment; such testing and lineup may be effected in a simple manner with the usual decibel meter or volt-ohmmeter and furthermore is operative with a system in which the facsimile carrier wave is not generated directly at the photocell, as by a light-chopper disk, but instead is generated by an oscillator. In this modulator as in the usual modulator, as contrasted to systems employing a light chopper, the output of the photocell is amplified before it is used to modulate the carrier. Because of a capacitor in the clamp circuit it would not normally be possible to have a modulator output without the transmitting drum rotating. However, by the use of an "artificial white" voltage (a voltage equal to that normally present at the output of the preamplifier when scanning the background of the subject copy) the effect of this capacitor is nullified and steady state output is achieved.

Among the objects of the invention are to provide a facsimile transmitting system in which increased flexibility of operation is obtained; to provide such a system which readily may be switched either to linear or non-linear operation for different grades of copy by a patron, clerk or other non-technical personnel, and which readily may be switched to effect reversal from negative to positive reproduction from copy bearing subject matter that is lighter in color than the background; to provide means for maintaining a desired background signal level which is not disturbed when scanning the area between the adjacent edges of a subject copy transmitting blank wrapped around a transmitting drum, such as formed by a gap between the edges, or overlapped edge portions of the blank and including any device for clamping the adjacent edges of the blank on the drum; and the provision of means for establishing a suitable artificial background signal level to facilitate testing and alignment procedures.

Other objects and advantages will be apparent from the following detailed description, taken in connection with the accompanying drawing showing a facsimile transmitting circuit embodying the principles of the invention.

Referring to the drawing, facsimile pickup signals are generated by facsimile scanning apparatus diagrammatically indicated by reference numeral 2. Such apparatus commonly comprises a motor-driven transmitting drum 3 around which is wrapped a telegram, letter or other blank B bearing the subject copy to be transmitted. The blank may be scanned in any suitable manner, as by a light beam and photocell pickup device 4. A phasing and/or blanking pulse is produced during each revolution of the drum in any suitable manner, although preferably these pulses are generated by a cam 5 that rotates with the drum and has a lobe structure 6 which controls a normally closed pair of contacts 7 and a normally open pair of contacts 8 for the purposes hereinafter set forth. Contacts 8 are connected across the outgoing transmission line by means of conductors 9 and 10. Preferably the lobe structure 6 on the cam is adjustable to determine the duration of each pulse in the manner set forth in U.S. Patent No. 2,718,548, issued September 20, 1955. The pickup signals produced by the photocell are amplified in a preamplifier 12 in which the signals are inverted in conventional manner. From the preamplifier, positive going signals (black) arrive at the junction 14 of resistors 16 and 18. Each of these has a value, for example, 20,000 ohms, such that the resistors in parallel act as a 10K. load resistor for the output cathode follower stage of the preamplifier. For positive linear output of the modulator circuit, the signal path is through the adjustable tap on resistor 18 and thence through contact 1 and blade of a switch section 20 of a three-position gang switch, and applied to the grid of a vacuum tube V1A which operates to couple the output of the preamplifier to the modulator. This tube may conveniently comprise one-half of a 12AU7 type. A second section 21 of the gang switch connects the signal output from the cathode of V1A through a 2 mfd. coupling capacitor 26, and contact 1 and blade of the switch section 21 to a clamper diode rectifier 27. The clamper diode restores the D.C. reference of the signals from the preamplifier, which reference was lost due to the capacitor 26. Accordingly the diode 27 is poled with its anode connected through the normally closed contacts 7 of the phasing and blanking cam structure 5 and thence to a reference potential, which conveniently may be ground, so that positive going signals are clamped to this potential or ground as a reference, and the background level of the output of the modulator is maintained at minimum for different colors of subject copy. Wave forms *a* and *b* depict the linear character of the signals appearing at the places indicated by the arrows. The top of these wave forms represents the black signals and the bottom thereof which extends along a straight line represents the white, or background level, of the signals. During the phasing and/or blanking intervals the contacts 8 of the cam structure 5 are closed across conductors 9 and 10 to thereby short-circuit the out-going transmission line during these intervals in known manner, and the contacts 7 are opened during such intervals. The purpose of the contacts 7 is to remove the clamper diode 27 from the circuit during the interval when the scanning photocell is viewing either a gap between the adjacent edges of the rolled subject copy B on the transmitting drum 3 or any overlapped portion of the copy sheet or any clamping or holding device which may be used to secure the subject copy to the drum. Thus any signals which may be generated by the photocell when scanning a bare portion of the drum or the clamping mechanism do not change the charge on the capacitor 26 and therefore do not affect the operation of the clamping circuit. If diode 27 were not thus disconnected, a signal generated from the bare drum or clamping element, or from an overlapped portion of the blank B, might serve to introduce a signal stronger than that from the background of the subject copy and thus create a false background level to which the clamping circuit would respond and cause streaks or background to appear in the recorded copy.

The clamped signals are connected to the grid of a vacuum tube V1B, which is the second section of the 12AU7 tube above mentioned, the path of the signals comprising a conductor 28 and the normally closed upper contact and blade of a test button 29. The anode of tube V1B has 150 v. positive battery connected thereto through conductor 30. The output from the cathode of V1B is applied to the input of a modulator V2, through the left hand center-tapped winding of a transformer 32. Carrier frequency generated by the oscillator is coupled, through the transformer 32, to the input of the modulator V2 which may be of any suitable type, for example, a crystal diode type or, as illustrated, a tube modulator. A balance control 54 has its slider connected to a contrast control 52. A balance control 55 is also inserted in the plate circuit of the modulator. The anode side 35 of the oscillating circuit is connected to 150 v. positive from conductor 30 through an anode resistor 36, and to the anode grid of a conventional converter tube V3, which may be a type 6BE6. The plate of this tube is left disconnected. The other side of the oscillating circuit is connected through a resistor 37 to ground. The right hand winding of transformer 32 together with capacitors 39 to 41 and tube V3 comprise a modified Clapp carrier frequency oscillator, although any other suitable type of oscillator circuit may be employed. The right hand winding of the transformer 32 may be tapped as indicated to provide different frequencies for different speeds of operation. Resistor 34 is bridged across the left hand winding of transformer 32 to limit the voltage to a desired value. The modulated carrier output of V2 is coupled by capacitors 47 to an amplifier stage V4 having an output control 50. The output of V4 is coupled through a transformer 48 to terminals 49 of the outgoing transmission circuit.

The signal path for non-linear output of the modulator is through the adjustable tap of resistor 16 to the junction 17 of a capacitor 56 and a resistor 57. The operation of the non-linear circuit is as follows: Positive going signals cause a capacitor 58 to become charged to the peak voltage of these (black) signals. A portion of this voltage, from the junction of resistors 60 and 61 is connected to the anode of a diode 62. The cathode of diode 62 is connected to the signal source by the capacitor 56, and therefore when the amplitude of the signals on the cathode of the diode 62 is smaller than the voltage present on its anode, all signals will be conducted by this diode and will appear at contact 2 of the section 20 of the gang switch in an undistorted manner. However, when the amplitude of the signals on the diode cathode is larger than the voltage on its anode, these larger signals will be clipped, and thus the largest signal that can appear at contact 2 of the switch section 20 is one that just causes conduction of the diode 62. In practice, however, the amount of clipping or non-linearity is set by the adjustment of the slider of resistor 16 to make several of the darker shades of a copy all of equal amplitude. Since it is desirable to have the same maximum amplitude of output for both linear and non-linear operation, it will be seen that (since large signals have been clipped) the slider of resistor 16 must be set for a higher signal input than the slider of resistor 18. Wave form *c* depicts the non-linear character of these signals.

When the three-position gang switch is on position 2, which is the non-linear position, the clipped signals are connected to the grid of the tube V1A and the operation of the succeeding circuits is the same as in the foregoing linear operation.

Negative linear output is provided by the third position 3 of the gang switch. In this case the signal path may be traced from the slider of resistor 18 to position 3 of section 20 of the switch and thence to the grid of V1A. The output of V1A is now taken across a plate load resistor 24 which, for example, may have a resistance of 4.7K. This is an inverted signal as shown by the wave form *d*, and a capacitor 64 and the diode 27 now clamp this signal to maximum black. The modulator and amplifier operate the same as before except that the output is negative, with white as maximum. The switch section 22 allows the capacitor 64 to charge through a resistor 65 when the switch is in position 2, so that when the diode 27 is connected to the capacitor at position 3 of section 21 for negative output, a charging current will not be present to injure the diode. The tube V1A acts as a polarity inverter and enables the selection of equal amplitudes of positive or negative copy by the choice of plate or cathode connections as determined by the setting of switch section 21. The plate and cathode resistors 24 and 25 have the same value to insure the same amplitude of signal from either positive or negative copy, and coupling capacitors 26 and 64 are also of equal value.

The artificial white, or background level, adjustment of the system is obtained by means of the following elements. A source of low voltage direct current potential is applied across a potentiometer 66. Preferably, although not necessarily, this potential is obtained from a source 68 of alternating current such as utilized for the heater circuits of the various tubes. This current is applied by a transformer 70 to a conventional rectifier circuit including a rectifier 72 and associated filter resistors and capacitors 74, 76 and 78. The slider of the potentiometer coil 66 is connected to the lower contact of the test button 29; the upper end of the potentiometer is connected by a conductor 80 to the cathode of tube V1A.

The lineup procedure is as follows: Power is applied to the equipment which is allowed to warm up for two or three minutes. The gang switch is set to position 1, and a decibel meter is connected to the output terminals 49 and the scale set to read approximately +10 db. The sliders of the output control 50 and contrast control 52 are set to their maximum positions, and the balance controls 54 and 55 are set to approximately their center positions. A transmitting blank B, usually a test blank, is wrapped around the transmitting drum 3 and the drum is rotated by hand so as to scan a white area nearest to a maximum black area on the blank. The contrast control 52 is adjusted for the desired minimum level. If the maximum output of the modulator is approximately +10 db on black, and if the contrast control is set to read −15 db on white, a total spread of 25 db will be had and this is the commonly used contrast reading.

With a −15 db reading on white, the test button 29 is depressed and the slider of the potentiometer 66 (artificial white level) is adjusted until the reading of the db meter is the same as when the button is released. The action of the test button is to connect the grid of tube V1B to a source of potential 66 which will produce the same output level as a signal generated by the photocell when scanning the background of the subject copy B and thence directly over conductor 80 to the cathode of tube V1A, instead of through the capacitor 26, and in this way to allow the db meter to give a constant reading. Since the output at capacitor 26 is clamped to ground through the closed contacts 7, there is zero voltage at the grid of V1B on white. In order to have the same reading when the button 29 is depressed and the grid of V1B is connected to the cathode of V1A directly, it is necessary to balance out the D.C. voltage at that point, and the purpose of the potentiometer 66 is to buck out this voltage by an equal and opposite voltage which is provided by that portion of the potentiometer in the circuit of conductor 80. Thus the testing circuit includes a source of test potential adjusted to a value equal to the D.C. potential on the cathode of tube V1A when the transmitter is scanning the background of the subject copy. The switch device 29 when in its first, or upper, position connects the output from the cathode of V1A through the coupling capacitor 26 to the input V1B of the modulator and clamped to ground as a reference. In the second, or lower, position of the switch 29 the source of test potential 66 is connected in series between the cathode of the tube V1A and the input V1B to the modulator instead of through the capacitor 26, so that steady state outputs corresponding to the densities of the various areas of the subject copy may readily be observed and measured at the terminals 49. The test potential is so poled as to nullify the effect of the D.C. potential on the cathode of V1A when scanning the background of the subject copy.

When the artificial white level has been adjusted, the black level is checked by manually rotating the drum 3 to maximum black on the blank B and depressing the test button 29. A steady state signal may now be read on the db meter corresponding to the density of any portion of the subject copy.

The balance adjustment may easily be made by scanning ruled line copy on a blank. The oscillator tube V3 is removed from its socket and the drum is rotated. The db meter is set to maximum sensitivity (−10 scale), and the balance potentiometers 54 and 55 are adjusted for minimum output. The desired output level for maximum black is controlled by potentiometer 50.

The embodiment of the invention is for the purpose of illustrating the principles and one mode of application thereof, and various changes and modifications may be made without departing from the spirit of the invention which is not to be regarded as limited except as indicated by the scope of the appended claims.

What is claimed is:

1. A facsimile transmitter having means for scanning subject copy and generating facsimile intelligence signals which are linear in character, and means for converting the generated intelligence signals into signals which are non-linear in character, comprising a first diode having anode and cathode elements, a resistor and a capacitor in circuit for applying said linear signals to the cathode of said diode, a circuit including resistor means, a second diode and capacitance means coupled to said source of linear signals for deriving a predetermined biasing voltage, means for applying said biasing voltage to the anode of said first diode to cause the diode to conduct when the amplitude of the linear signals applied to its cathode is smaller than said predetermined biasing voltage present on its anode and in effect to clip the signals when the amplitude of the signals applied to its cathode is larger than said biasing voltage on its anode.

2. A facsimile transmitter having means for scanning and generating facsimile intelligence signals from subject copy, an amplifier having anode, cathode and grid elements, resistances of substantially equal value in circuit respectively with said anode and cathode elements, means for applying said signals to said grid element, means for generating a carrier wave, a modulator controlled by the output from said amplifier for modulating said carrier, switching means, circuits operative in one position of the switching means to connect the output from the cathode of said amplifier to the input of said modulator, circuits operative in another position of said switching means to connect the output from the anode of said amplifier to the input of said modulator, a source of reference potential having a value to maintain a predetermined background level of the transmitted signals, and a clamping circuit operative in each of said positions of the switching means for clamping the signals from the output of said amplifier to said reference potential.

3. A system according to claim 2, in which the cathode and anode of said amplifier each has a coupling capacitor in series with its output circuit, and said clamping circuit includes a rectifier having its cathode connected to the output side of the coupling capacitor in either of said output circuits and having its anode connected to said reference potential.

4. A facsimile transmitter having means including a photocell for scanning and generating facsimile intelligence signals from subject copy, an electron tube having anode, cathode and grid elements, means for applying said facsimile signals to said grid element, a coupling capacitor in the output circuit of said cathode, means for generating a carrier wave, a modulator for the carrier, testing means including a source of test potential adjustable to a value corresponding to the background or other selected areas of the subject copy to produce the same modulator output as a signal generated by the photocell when scanning said background or other selected areas of said subject copy, and a switch device having first and second operative positions, a circuit controlled by the switch device in said first position thereof for coupling the signal output from the cathode of the electron tube through the coupling capacitor to said modulator, and a circuit operative in said second position of the switch device for connecting the output from the cathode of said electron tube in series with said source of test potential to said modulator instead of through the coupling capacitor whereby steady state outputs corresponding to the densities of the various areas of the subject copy may be measured.

5. A facsimile transmitter having means including a photocell for scanning and generating facsimile intelligence signals from subject copy, an electron tube having anode, cathode and grid elements, means for applying said facsimile signals to said grid element, a coupling capacitor in the output circuit of said cathode element and a diode in circuit with said capacitor for clamping the signals to a source of reference potential, means for generating a carrier wave, a modulator for the carrier, and testing means including a source of test potential adjustable to a value equal to the direct current potential on the cathode of said electron tube when the transmitter is scanning either the background or other selected areas of the subject copy, said testing means including a switch device having first and second operative positions, a circuit controlled by said switch in its said first position to connect the signal output from said cathode through said coupling capacitor to the input of said modulator and clamped to said reference potential, and a circuit controlled in said second position of the switch device for connecting said source of test potential in series with the output from said cathode and the input of the modulator instead of through the coupling capacitor so that steady state outputs corresponding to the densities of the various areas of the subject copy may be observed.

6. A facsimile transmitter according to claim 5, in which said source of test potential is so poled as to nullify the effect of the direct current potential caused by the signal on the cathode of said vacuum tube while scanning various areas of the subject copy to be measured.

References Cited in the file of this patent

UNITED STATES PATENTS

| | | |
|---|---|---|
| 1,690,300 | Horton | Nov. 6, 1928 |
| 1,706,032 | Long | Mar. 19, 1929 |
| 1,743,856 | Ives | Jan. 14, 1930 |
| 1,746,729 | Ives | Feb. 11, 1930 |
| 2,222,991 | Sorkin | Nov. 26, 1940 |
| 2,262,156 | Barnes | Nov. 11, 1941 |
| 2,326,740 | Artzt | Aug. 17, 1943 |
| 2,431,824 | Poch | Dec. 2, 1947 |
| 2,453,905 | Grib | Nov. 16, 1948 |
| 2,506,668 | Haynes | May 9, 1950 |
| 2,535,610 | Thompson | Dec. 26, 1950 |

FOREIGN PATENTS

| | | |
|---|---|---|
| 174,962 | Germany | May 26, 1953 |

OTHER REFERENCES

"Radar Electronic Fundamentals," (TM 11–466) War Department, June 29, 1944, page 140.